(12) United States Patent
Lydon et al.

(10) Patent No.: US 6,757,302 B1
(45) Date of Patent: Jun. 29, 2004

(54) CHANNEL STATUS MANAGEMENT FOR MULTICHANNEL AUDIO DISTRIBUTION

(75) Inventors: Donald S. Lydon, Grass Valley, CA (US); Charles S. Meyer, Nevada City, CA (US)

(73) Assignee: Nvision, Inc., Grass Valley, CA (US)

( * ) Notice: Subject to any disclaimer, the term of this patent is extended or adjusted under 35 U.S.C. 154(b) by 749 days.

(21) Appl. No.: 09/661,845

(22) Filed: Sep. 14, 2000

(51) Int. Cl.[7] .............................. H04J 3/06; H04S 3/00
(52) U.S. Cl. ...................... 370/503; 370/517; 381/119; 700/94
(58) Field of Search ................................. 370/326, 345, 370/437, 442, 462, 464, 498, 503, 512, 514, 517, 537, 540, 541; 340/2.8; 369/47.15, 47.16, 47.2; 700/94; 381/103, 119, 123

(56) References Cited

U.S. PATENT DOCUMENTS

| | | | | |
|---|---|---|---|---|
| 5,245,667 A | * | 9/1993 | Lew ........................... | 381/94.4 |
| 5,923,710 A | * | 7/1999 | Shuholm et al. ............ | 375/260 |
| 6,104,997 A | * | 8/2000 | Shuholm .................... | 704/500 |

FOREIGN PATENT DOCUMENTS

| | | | | |
|---|---|---|---|---|
| GB | 2273022 A | * | 6/1994 | ........... H04L/25/36 |

OTHER PUBLICATIONS

Ligthart et al, Design of a Digital Input output Chip, IEEE 1989, Custom Integrated Crcuit Conference.*

Angelici et al, New Architecture for an AES–EBU Digital Audio Receiver, IEEE, vol. 43, No. 3 Aug. 1997.*

* cited by examiner

Primary Examiner—Hassan Kizou
Assistant Examiner—Ahmed Elallam
(74) Attorney, Agent, or Firm—John Smith-Hill; Smith-Hill and Bedell (57) ABSTRACT

First and second successions of data words, each data word including multiple payload data bits, a data block bit (C) and a block character (SOB) having a first state to indicate start of a sequence of data block bits and otherwise having a second state, are processed by detecting as a first event occurrence of the block character of the first succession of data words in the first state and as a second event the next succeeding occurrence of the block character of the second succession of data words in the first state, wherein the second event is delayed by a time Tz relative to the first event, reading the data block bits from successive data words of the first succession and generating a succession of delayed data block bits of the first succession of data words, delayed by the time Tz relative to the payload data bits of the first succession of data words. The data block bits of the delayed succession of data block bits are inserted in successive words of the first succession of data words, so that the start of the sequence of data block bits in the first succession of data words coincides with the start of the sequence of data block bits in the second succession of data words.

7 Claims, 3 Drawing Sheets

CHANNEL STATUS MANAGEMENT FOR MULTICHANNEL AUDIO DISTRIBUTION

CROSS-REFERENCE TO RELATED APPLICATION

The subject matter disclosed in thin application is related to subject matter disclosed in co-pending patent applications Ser. No. 09/661,844 and Ser. No. 09/661,842, the entire disclosure of each of which is hereby incorporated by reference herein for all purposes.

BACKGROUND OF THE INVENTION

This invention relates to channel status management for multichannel audio distribution.

The Audio Engineering Society and the European Broadcasting Union have established a standard which describes a signal format for distributing two channels of audio material in a digital data stream. The data stream, which is frequently referred to as the AES3 data stream, is composed of frames, and each frame of the AES3 data stream is composed of two channel subframes, which are referred to as subframe A and subframe B, in sequence. The format of one subframe is shown schematically in FIG. 1.

Figure 1:
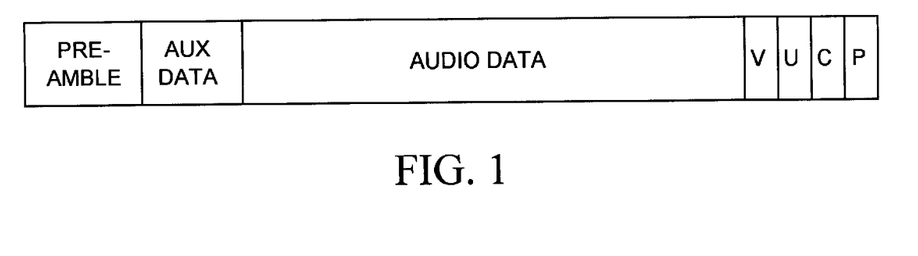
FIG. 1 illustrates the format of a frame of the AES3 data stream.

Referring to FIG. 1, each subframe of the AES3 data stream has 32 bits and includes a preamble occupying four bit times, 24 bits of payload data, and four control bits (V, U, C and P). The payload data consists of 20 bits of audio data and four bits of auxiliary data, which may be audio data. The audio data bits (20 or 24) represent one audio sample. Conventionally, the sample frequency of each channel of the AES3 data stream is in the range from 32 kHz to 50 kHz for most applications. For professional applications, the standard sample frequency is currently 48 kHz but there is a trend towards using a sample frequency of 96 kHz.

The AES3 data stream utilizes a biphase mark coded signal. In biphase mark coding, one source data bit occupies a single time slot. Each source data bit is represented by a two cell doublet. Each coding doublet begins, and therefore also ends, with a transition. A source data bit 1 generates a transition between the two cells of the doublet, whereas a source data bit zero does not. Thus, a source data bit zero is represented either as the doublet 00 or the doublet 11, while the source data bit 1 is represented either by the doublet 10 or the doublet 01. Because of the requirement that each coding doublet should end with a transition, the cell sequence 000 or 111 cannot be generated by encoding source data bits. In accordance with the AES3 standard, the first four time slots of each subframe constitute a preamble containing at least one occurrence of the three cell sequence 000 or 111. This brief departure from the usual biphase mark coding rules is known as a code violation.

There are three forms of preamble. The Z preamble designates the start of subframe A of a frame that is the first frame in a sequence of 192 frames, the A preamble designates the start of subframe A of other frames, and the B preamble designates the start of subframe B.

Figure 2:
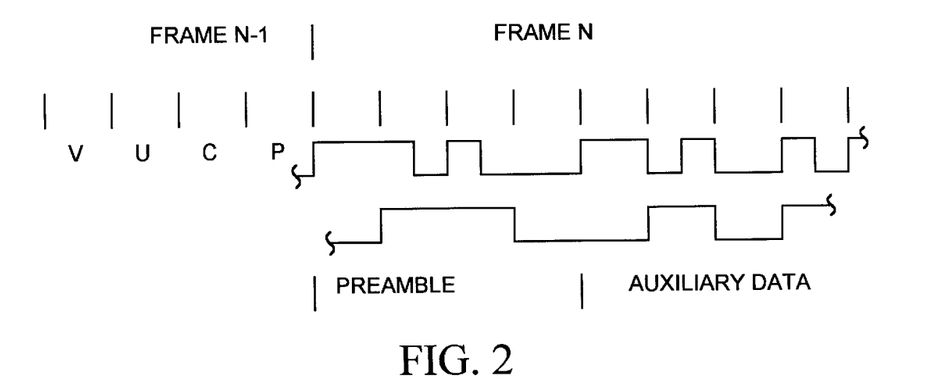
FIG. 2 illustrates encoding of data bits in the AES3 data stream.

The upper waveform in FIG. 2 shows by way of example the pattern of cell values of the AES3 data stream during the interval about the boundary between subframe B of frame N−1 and subframe A of frame N whereas the lower waveform shows the corresponding pattern of NRZ data values. The last four bits of frame N−1 are the V, U, C and P bits and the first four bit times of frame N are occupied by the preamble. In the case of FIG. 2, the preamble is in one of two possible forms of the Z preamble. The preamble is followed by the four bits of auxiliary data: FIG. 2 illustrates the sequence 0, 1, 0, 1.

The sequence of 192 C (channel status) bits in channel A or channel B between two consecutive occurrences of the Z preamble constitutes a channel status block that conveys information regarding the type of data used to create that particular channel of the AES3 data stream. Since the Z preamble can occur only at the start of subframe A, the AES3 standard requires that the boundary of the channel status block for channel B should coincide with the boundary of the channel status block for channel A.

The AES3 standard requires that equipment that processes audio data and reinitializes the channel status bits must maintain the channel pair correlation and must re-stripe the Z framing so that the new channel status information can be recovered.

Frequently, the two channels of an AES3 data stream are related, for example as L+R and L−R stereo channels, in which case the two channels will generally be processed in parallel and will not be subject to differential delay. Further, it will not generally be necessary or desirable to combine one channel of a pair of related channels with an unrelated channel. However, the AES3 standard does not require that the two channels of an AES3 data stream be related, and the possibility exists of its being desirable to construct an output data stream by extracting one channel from a first input AES3 data stream and combining it with one channel of a second input AES3 data stream. An impediment to constructing an output data stream in this way has been that the channel status blocks of the two input data streams would generally not be aligned and accordingly the new data stream would not comply with the AES3 standard.

U.S. patent application Ser. No. 09/436,461 filed Nov. 8, 1999, the entire disclosure of which is hereby incorporated by reference herein, discloses apparatus for multiplexing AES3 data streams to form a multichannel data distribution stream. In accordance with one part of the disclosure of that application, each subframe of the AES3 frame is truncated. The multichannel distribution frame has a header which includes a 4-bit preamble for multiplexer framing, and this allows the preamble of the individual AES3 subframes to be truncated to a single Z bit having the value 1 in the event that the preamble of subframe A is the Z preamble and a value 0 in the event that the preamble of subframe A is the A preamble.

In some circumstances, it may be desirable to extract two channels of the multichannel distribution frame and combine them to generate an AES3 data stream. Normally, it cannot be ensured that the boundaries of the channel status blocks of the two channels coincide.

Under the AES3 standard, the user bit U may be used in any way required by the user but the standard recognizes that it may be advantageous to adopt a block structure similar to that of the channel status bits, with block boundaries aligned with those of the channel status data blocks.

SUMMARY OF THE INVENTION

According to a first aspect of the present invention there is provided a method of processing first and second successions of data words, each data word including multiple payload data bits, a data block bit (C) and a block character (SOB) having a first state to indicate start of a sequence of data block bits and otherwise having a second state, said a method comprising detecting as a first event occurrence of the block character of the first succession of data words in the first state and as a second event the next succeeding occurrence of the block character of the second succession of data words in the first state, wherein the second event is delayed by a time Tz relative to the first event, reading the data block bits from successive data words of the first succession and generating a succession of delayed data block bits of the first succession of data words, delayed by said time Tz relative to the payload data bits of the first succession of data words, and inserting the data block bits of the delayed succession of data block bits in successive words of the first succession of data words, so that the start of the sequence of data block bits in the first succession of data words coincides with the start of the sequence of data block bits in the second succession of data words.

According to a second aspect of the present invention there is provided a routing switch for connection to a plurality of signal sources each providing a data stream composed of a succession of frames, each frame having first and second subframes, wherein the first subframe includes framing bits and each subframe includes multiple payload data bits and a data block bit, the framing bits having a first state to indicate start of a sequence of data block bits and otherwise having a second state, the succession of first subframes constituting a first channel and the succession of second subframes constituting a second channel, and the routing switch including a plurality of input modules having respective input terminals for connection to the signal sources, a plurality of output modules each having an output terminal for connection to a signal destination, and a routing core for supplying selectively a channel of a first data stream and a channel of a second data stream to any selected output module for combination to provide the output data stream, and wherein each output module includes a circuit which selectively delays the data block bits of one channel to bring the data block bits of the one channel into phase alignment with the data block bits of the other channel.

According to a third aspect of the present invention there is provided a method of processing first and second data streams each composed of a succession of frames, each frame having first and second subframes, the succession of first subframes constituting a first channel and the succession of second subframes constituting a second channel, wherein each subframe includes multiple payload data bits and a data block bit and the first subframe includes a framing character having a first state to indicate start of a sequence of data block bits and otherwise having a second state, said method comprising (a) composing an output data stream from a channel of the first data stream and a channel of the second data stream, and (b) delaying the data block bits of one channel relative to the payload data bits of the one channel to bring the data block bits of the one channel into phase alignment with the data block bits of the other channel.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 3:
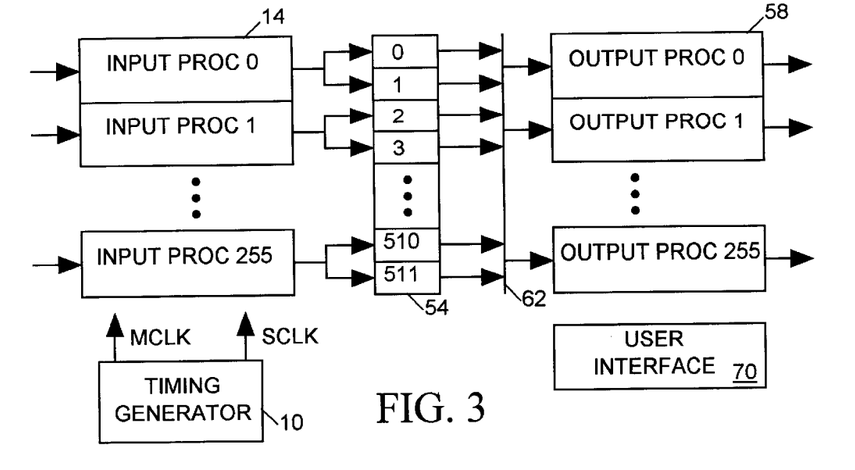
FIG. 3 is a schematic block diagram of apparatus in accordance with the present invention.

FIG. 3 illustrates a router having 256 inputs for connection to respective AES3 signal sources (not shown), each of which is able to provide a serial AES3 input data stream, and 256 outputs, for connection to respective signal destinations (not shown). The router is able to extract one channel each from any two of its input data streams and construct an AES3 output data stream and supply it to any one or more outputs.

FIG. 3 illustrates a timing generator 10 which generates a master clock signal MCLK having a frequency of 1.536 MHz and an audio sample clock SCLK at $\frac{1}{32}$ times the master clock frequency (48 kHz). The master clock signal MCLK is supplied to the AES3 sources. Operation of each of the AES3 sources is locked to the master clock, and each of the AES3 sources generates an AES3 data stream having a sample rate Fs of 48 kHz or 96 kHz. Since the AES3 sources are locked to the same master clock, the data streams are isochronous.

Figure 4:
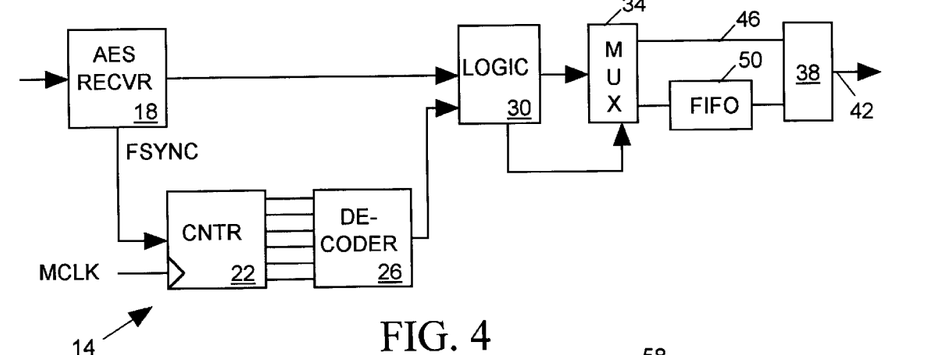
FIG. 4 illustrates in greater detail an input processor of the apparatus shown in FIG. 3.

Each input of the router is connected to an input processor 14. Referring to FIG. 4, each input processor includes an AES3 receiver 18, which is of conventional form and detects the code violation and locks to the biphase data stream, decodes the biphase mark data to unframed NRZ form, generates output clocks for control purposes and generates overhead bits. It will be appreciated by those skilled in the art that although the sample frequencies of the input data streams are 48 kHz or 96 kHz, the data streams received by the AES3 receiver 18 are not generally in phase on a frame-by-frame basis. Accordingly, the AES3 receiver includes a buffer which selectively delays the data stream so that the frame boundaries are aligned across the outputs of all AES3 receivers.

One of the output signals generated by the standard AES3 receiver is designated FSYNC and is a square wave signal whose frequency is equal to the sample rate of the incoming AES3 data stream, i.e. 48 kHz or 96 kHz in the case of this example. Typically, the signal FSYNC is high during subframe A and is low during subframe B. The signal FSYNC is used to start and stop a resettable counter 22 that counts pulses of the master clock signal MCLK. If the counter 22 is running when it receives a rising edge of the signal FSYNC, the counter stops and is reset and the counter starts when it receives the next rising edge of the signal FSYNC. The counter 22 counts to 32 between successive rising edges of the signal FSYNC if the sample rate is 48 kHz and counts to 16 if the sample rate if 96 kHz. The count attained by the counter 22 before being reset is decoded by a decoder 26. If the count exceeds 24, the decoder provides a logic zero output whereas if the count is less than 24, the decoder provides a logic 1 output.

The NRZ data stream, including the overhead bits, is supplied to a logic block 30 which formats the data into a serial stream consisting of a 32-bit word for subframe A followed by a 32-bit word for subframe B. These words are referred to for convenience as the subframe A word and the subframe B word, even though it will be appreciated that the data is not in fact framed. Since each frame includes two subframes, the rate at which data words are supplied to the logic block 30 is twice the sample rate, i.e. 96 kHz for a 48 kHz sample rate and 192 kHz for a 96 kHz sample rate.

Figure 6:
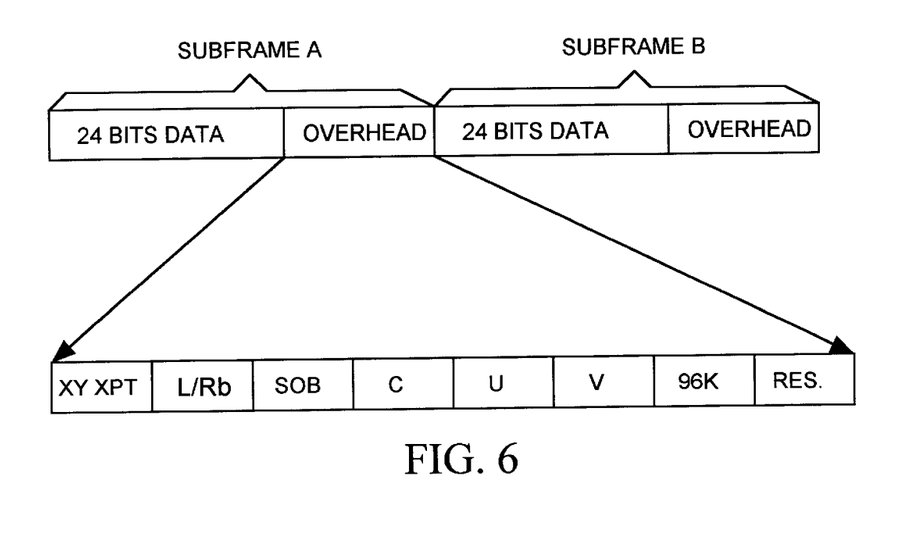
FIG. 6 illustrates the format of a frame of the data stream generated in the apparatus shown in FIGS. 3, 4 and 5.

Referring to FIG. 6, the 32-bit subframe word consists of 24 bits of payload data (MSB first) followed by 8 overhead bits designated XY XPT, L/Rb, SOB, C, U, V, 96K and RES respectively in FIG. 6. The XY XPT bit and the RES bit are not relevant to the present invention and will not be discussed further. Bit 25 (counting the MSB as bit zero) is the L/Rb bit and is 1 for subframe A and zero for subframe B. Bit 26 is the SOB (Start of Block) bit and is 1 for the first bit of the 192-bit channel status block of the input data stream and zero for the remaining 191 bits. The SOB bit for a channel B word is the same as the SOB bit for the next preceding channel A word. Therefore, each channel includes start of block information. C (bit 27) is the channel status bit from the corresponding subframe of the input data stream. U and V are, respectively, the user bit and the validity bit of the input data stream. Bit 30 is the 96K bit and indicates the sample rate of the input data stream. 96K is derived from the output of the decoder 26 and is 1 for a 96 kHz sample rate and zero for a 48 kHz sample rate.

In the event that the logic block 30 detects that 96K is 1, the logic block sets multiplexers 34 and 38 to supply the subframe words to the output 42 via a direct path 46. In this case, the subframe words are output from the input processor at the rate at which the subframes are received by the AES3 receiver. In the event that 96K is zero, the logic block 30 sets the multiplexers 34 and 38 to supply the subframe words to the output 42 via a FIFO register 50. In this case, a subframe A word and the next succeeding subframe B word are clocked into the FIFO 50 at the Fs rate (48 kHz) and are clocked out at the 2*Fs rate (96 kHz), which results in a sequence of four words for each two subframe words received from the AES3 receiver, with the data of the subframe A and subframe B words in the first two words and the other two words being null words, i.e. containing no data. Consequently, the output signal of the input processor 14 is always at 2*Fs.

FIG. 3 also illustrates a routing core implemented by a memory 54 having 512 addressable memory locations. The memory 54 has two pages, one of which is read while the other is written. For simplicity of illustration, only one page is shown in FIG. 3. The subframe A words of the data stream received from source i (i=0 . . . 255) are written to location $2i$ and the subframe B words of the data stream from source i are written to location $2i+1$. During the write cycle, each subframe word of the data stream provided by an input processor 14 is written into its appropriate memory location in the memory 54. During the read cycle, the subframe words are read from the 512 locations of the memory 54 in sequence and are placed on a serial data bus 62 in respective time slots. The read and write cycles each have a duration corresponding to one frame of an AES3 data stream at a sample rate of 2*Fs.

Figure 5:
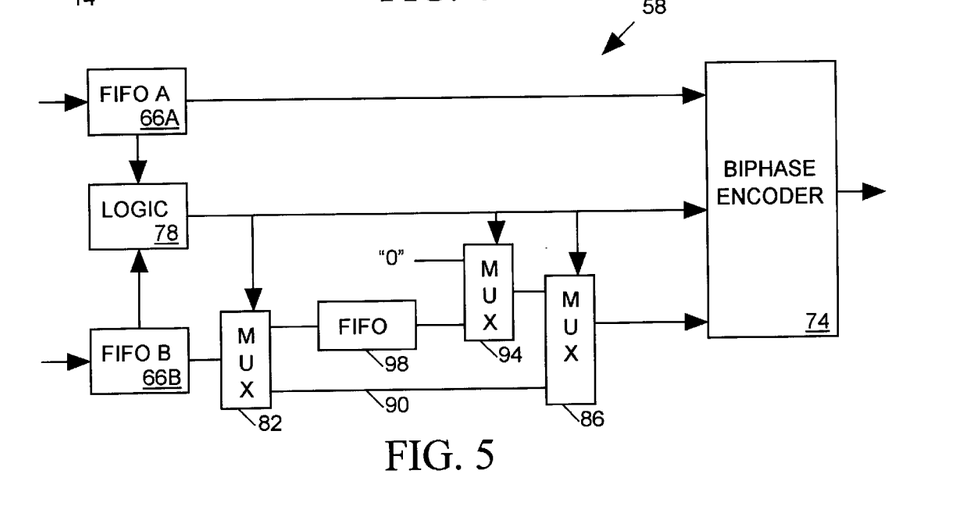
FIG. 5 illustrates in greater detail an output processor of the apparatus shown in FIG. 3.

The router includes 256 output processors 58, each of which has an output terminal for providing an output data stream to a signal destination. Referring to FIG. 5, each output processor 58 includes two FIFO registers 66A and 66B each having an input connected to the serial data bus 62. A user interface 70 receives from the user a request to supply channel x (x=A or B) of the data stream from source i and channel y (y=A or B) of the data stream from source j to destination k in channels A and B respectively of an AES3 data stream. This request is executed by controlling the FIFO registers 66A and 66B of output processor k to read the data bus 62 during the appropriate time slots of the memory read cycle. For example, if x=B and y=B, the FIFO registers 66A and 66B read the data bus during the time slots $(2i+1)$ and $(2j+1)$ respectively. At the end of the read cycle of the memory 54, the registers 66A and 66B contain respective subframe words. The two subframe words are shifted out of the FIFOs 66A and 66B respectively and are supplied to a biphase encoder 74, which combines the two subframe words to generate a frame of an AES3 data stream. Subframe A of the AES3 frame is derived from the subframe word from the register 66A and subframe B is derived from the subframe word from the register 66B.

The biphase encoder 74 has a sample rate control input for controlling whether the sample rate of the AES3 data stream is Fs or 2*Fs. When the registers 66A and 66B contain their respective subframe words, a logic block 78 tests bit 30 of register 66A, which contains the .96K bit for the subframe word that will be used to generate subframe A of the AES3 frame, and provides a signal to the sample rate control input of the biphase encoder 74 to generate an output data stream at the sample rate indicated by the state of the 96K bit.

Let us assume initially that the sample rate of each of the selected input data streams is 96 kHz and accordingly the 96K bit of each subframe word is 1. When the registers 66A and 66B contain their respective subframe words, the logic block 78 tests bit 30 of register 66A and determines that the 96K bit of the subframe word stored in that register is 1. The logic block 78 provides a signal to the sample rate control input of the biphase encoder 74 to generate an output data stream at 96 kHz.

Bit 26 of each register contains the SOB bit for the subframe word in that register. Because the input data streams received by the input processors 14 are not necessarily channel status block aligned across all the inputs to the router, in general the SOB bits of the two subframe words stored in the registers 66A and 66B respectively will not be phase aligned, i.e. if the SOB bit of the word stored in the register 66A is high, in general the SOB bit of the word stored in the register 66B will not be high. The logic block 78 also tests bit 26 of each register to determine the states of the respective SOB bits. If the two SOB bits are both high, the SOB bit for subframe B is phase-aligned with the SOB bit for subframe A. In this case, the logic block 78 sets multiplexers 82 and 86 to supply the subframe B word to the biphase encoder 74 via a direct path 90. The biphase encoder 74 combines the subframe A word and the subframe B word to generate a valid AES3 frame. The biphase encoder uses the SOB bit of the subframe A words to determine the form (A or Z) of the preamble of subframe A of the AES3 data stream. The SOB bit of the subframe B words received by the biphase encoder has no effect on operation of the biphase encoder.

If the SOB bit for the subframe A word is 1 and the SOB bit for the subframe B word is 0, the logic block 78 controls the multiplexer 86 to select the multiplexer 82 for all bits of the subframe B word other than the C bit and to select a multiplexer 94 for the C bit of the subframe B word. Let us assume that the SOB bit for subframe B is delayed by n sample times (n=1 . . . 191) relative to the SOB bit for subframe A. The logic block 78 responds to the SOB bit for subframe A being 1 (while the SOB bit for subframe B is 0) by setting the multiplexer 94 to select "0". The multiplexers 86 and 94 insert zero for the C bit of the subframe B word supplied to the AES3 encoder. On the nth sample, the logic block 78 will detect that the SOB bit for subframe B is 1 and responds by controlling the multiplexer 82 to supply the C bit of the subframe B word to a FIFO 98 and to supply the other bits of the subframe B word to the multiplexer 86 via the path 90. The logic block 78 continues to set the multiplexer 94 to select "0" and to control the multiplexer 86 to select the multiplexer 94 for the C bit of the subframe B word. During this initial period, the subframe A word is biphase encoded by the encoder 74 along with the data, U and V bits of the subframe B word, but it will be appreciated that the frame provided by the biphase encoder is not a valid AES3 frame because the C bits of the subframe B words have been forced to zero. This mode of operation continues until the logic block 78 detects the next occurrence of the SOB bit of the subframe A word in the high state. At this time, there are 192 C bits in the FIFO register 98. The logic block 78 read enables the FIFO 98 and switches the multiplexer 94 to select the FIFO 98. The multiplexer 94 therefore provides the C bits of the subframe B words, delayed by (192−n) sample times relative to the payload data bits of the subframe B words. The multiplexer 86 inserts the delayed C bits of the subframe B words into respective subframe B words, replacing the C bits of the words read from the register 66B. In this manner, the channel status blocks of the two streams of subframe words are brought into phase alignment. The frame generated by the biphase encoder 74 is a valid AES3 frame.

In the event that the logic block 78 determines that bit 30 of the register 66A is 1 and bit 30 of the register 66B is zero, the logic block 78 instructs the biphase encoder to generate an output data stream at 96 kHz. The subframe A data is derived from the subframe A words supplied from the register 66A. The logic block 78 operates the FIFO 66B in a mode in which a valid subframe B data word is written into the register during a first operating cycle of the serial data bus 62 and is read twice before being replaced by the next valid subframe B data word. The null words are not written into the register 66B.

In the case in which the two input data streams each have a sample rate of 48 kHz, and consequently each sequence of four subframe words includes two null words, the logic block 78 determines that the 96K bit of the subframe A word is zero and instructs the biphase encoder 74 to generate an output data stream having a sample rate of 48 kHz. The logic block 78 operates the registers 66A and 66B in a mode in which every other data word is read from each register at a 48 kHz sample rate and the null words are discarded.

If the logic block 78 detects that bit 30 of the register 66A is low and bit 30 of the register 66B is high, it instructs the biphase encoder 74 to generate an output data stream having a sample rate of 48 kHz. Every other word of each stream is discarded. It will be appreciated that there is no loss of data with respect to channel A but that half the data of channel B is lost.

The foregoing description of the operation of the apparatus shown in FIG. 3 does not take account of device latency. Those skilled in the art will appreciate that adjustments in timing of the operations performed by the apparatus may be necessary to take account of latency.

In accordance with a modification, the user bit U may be treated in similar fashion to the channel status bit C, supporting block encoding of the user bit. In this case, both bit 70 and bit 28 of the subframe B word are clocked into the shift register 98 and delayed relative to the payload data bits.

For the sake of simplicity in this example, it has been assumed that each signal source operates at a sample frequency of either 48 kHz or 96 kHz and that all signal sources are isochronous. However, it is not essential to the invention that the input data streams be isochronous and it is in fact possible that the input data streams could be at sample frequencies other than 48 kHz and 96 kHz. It would then be necessary for the input processors to insert additional samples and/or delay the subframe words to ensure that the subframe words are aligned across all inputs to the memory 54, but these measures are not relevant to the invention and therefore have not been described herein.

Figure 7:
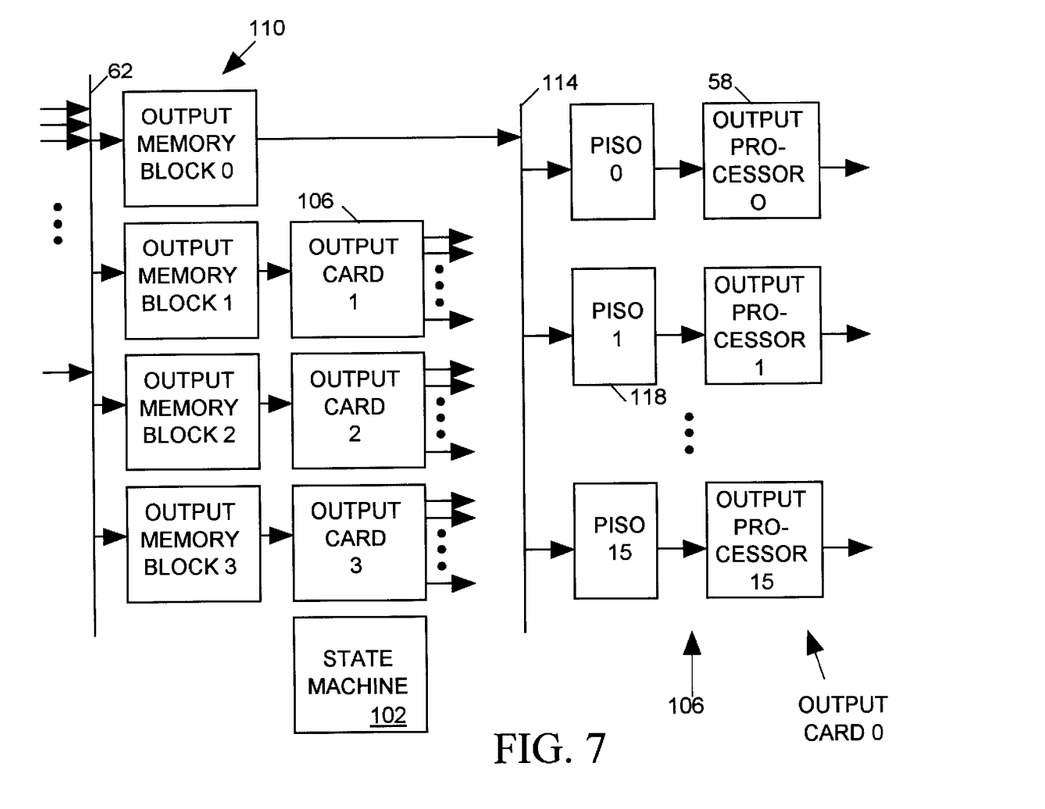
FIG. 7 illustrates a development of the apparatus shown in FIG. 3.

In a practical-application of the invention, four 256*256 routers as shown in FIG. 3 are connected to provide a 1024*1024 routing switch and each router is composed of four 256*64 router modules, as described in co-pending patent application Ser. No. 09/661,844. Each router module has substantially the topology shown in FIG. 3, except that it has only 64 output processors. Referring to FIG. 7, each router module includes a crosspoint card carrying the memory 54 and the bus 62. A state machine 102 controls writes and reads to and from the memory 54. The router module also includes four output cards 106. Sixteen output processors 58 are provided on each output card 106.

A second level of time domain multiplexing is interposed between the bus 62 and the output processors 58. Thus, an output memory 110 on the crosspoint board is written from the bus 62. The output memory 110 is organized as four blocks. Each memory block serves one output card 106 and has a sequence of 32 locations associated with each of the 16 output processors on the card. During an operating cycle of the bus 62, having a duration corresponding to one frame of the AES3 data stream at a sample rate of 2*Fs, the state machine 102 places each of the 512 data words stored in the memory 54 sequentially on the bus 62. During each time slot of the operating cycle of the bus 62, the state machine 102, operating in response to commands provided by the user interface, write enables selected locations of the output memory 110 and writes a subframe word into each such memory location. At the end of the operating cycle of the bus 62, one subframe word is stored in each location of the memory 110.

The 512 subframe words stored in output memory block 0 are then read from the respective memory locations in strict order of address and are placed on a TDM bus 114 in successive time slots during the period of one frame at 2*Fs. Sixteen PISO registers 118 on the crosspoint card are connected for accessing the bus 114 and for supplying subframe words to output card 0. The state machine 102 writes the 512 subframe words to the PISOs 118 in strict order of time slot in the operating cycle of the TDM bus 114. Specifically, the subframe words in time slots 0–15 are written to PISOs 0–15 respectively, followed by the subframe words in time slots 16–31, and so on until 32 subframe words have been written to each of the 16 PISOs. By this manner of operation, a subframe of the serial AES3 input data stream provided by any one of the signal sources can be placed in any one of the 32 time slots that is written to any one of the PISOs 118.

PISOs 0–15 supply serial data words to output processors 0–15 respectively. During the period of one AES3 frame at a sample rate of 2*Fs, each PISO 118 provides an output stream of 32 subframe words to its respective output processor.

For clarity, FIG. 7 does not show the TDM buses connected to output memory blocks 1–3 or the PISOs that are connected to those buses. Further, the individual output processors on output cards 1–3 are not shown in FIG. 7.

It will be appreciated from the foregoing that each output card 106 receives sixteen signals, each of which carries in time division multiplexed form 32 subframe words. The sixteen signals are assigned to the sixteen output processors respectively. Each output card is either a sync card or a digital signal processing card.

An output processor of a sync card simply combines two subframes words to provide an AES3 frame, in the manner described with reference to FIG. 5. In this case, the FIFOs 66 read subframe words 1 and 17 respectively, and the subframe words that are placed in slots 2–16 and 18–32 are not used to form the AES3 frame. By default, the data word in location 0 of the output memory block is placed in each of these slots.

Figure 8:
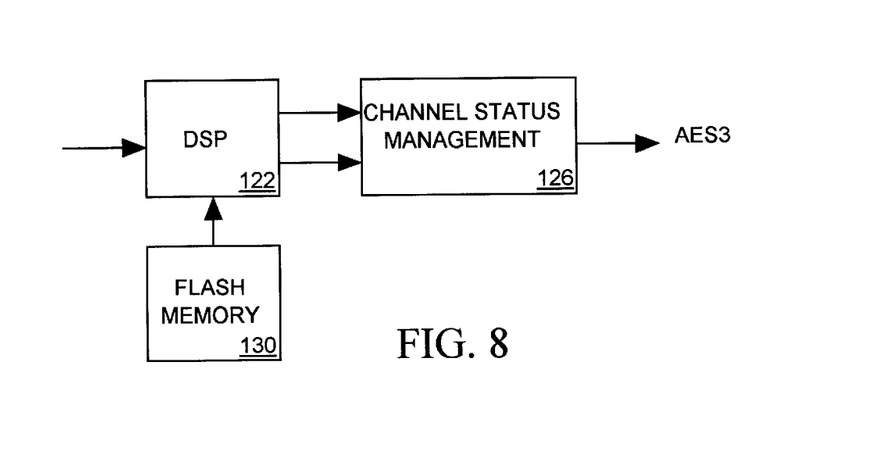
FIG. 8 illustrates an alternative form of output processor.

FIG. 8 illustrates an output processor of a digital signal processing output card. The serial stream provided by the PISO 118 is supplied to a digital signal processor 122, which manipulates two or more of the subframe words in slots 0–15 to generate a subframe A word and manipulates two or more of the subframe words in slots 16–31 to generate a subframe B word. The subframe A and subframe B words are supplied to a channel status management block 126 in accordance with FIG. 5 for combination to generate an AES3 frame.

Although each output card has 16 output processors, it is not necessary that a digital signal processing output card include 16 digital signal processors since a single commercially available DSP can support the digital signal processing requirements for multiple output data streams. The code that controls the manipulation performed by the DSP is stored in a flash memory 130. The code allows the DSP to perform any of the functions of a standard audio mixer, including mixing, cross fade, gain adjustment on an input and output basis, delay on an input and output basis, phase inversion, stereo mix down, phase adjustments and gain in hand. The specific function performed is selected by a command provided by the user interface. The digital signal processing may also perform other functions such as various types of encoding, filtering, equalization, emphasis, de-emphasis and sample rate conversion.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A method of processing first and second successions of data words, each data word including multiple payload data bits, a data block bit (C) and a block character (SOB) having a first state to indicate start of a sequence of data block bits and otherwise having a second state, said method comprising:

detecting As a first event occurrence of the block character of the first succession of data words in the first state and as a second event the next succeeding occurrence of the block character of the second succession of data words in the first state, wherein the second event is delayed by a time Tz relative to the first event, reading the data block bits from successive data words of the first succession and generating a succession of delayed data block bits of the first succession of data words, delayed by said time Tz relative to the payload data bits of the first succession of data words, and inserting the data block bits of the delayed succession of data block bits in successive words of the first succession of data words, so that the start of the sequence of data block bits in the first succession of data words coincides with the start of the sequence of data block bits in the second succession of data words.

2. A method according to claim 1, comprising loading a data word of the first succession of data words into a first register, loading a data word of the second succession of data words into a second register, and reading the data words from the first and second registers respectively and combining them to form a single frame of a composite data stream, and wherein the step of detecting the first and second events comprises testing the contents of the first and second registers to detect whether either register contains the block character in the first state.

3. A method according to claim 1, comprising receiving first and second data streams each composed of a succession of frames, each frame including first and second subframes, wherein each subframe includes multiple payload data bits and a data block bit, and deriving the data words of the first succession from the subframes of the first data stream and deriving the data words of tile second succession from the subframes of the second data stream.

4. A method according to claim 3, comprising detecting the frame frequency of the first data stream by generating a frame frequency signal having a frequency equal to the frame frequency, generating a reference signal at a frequency substantially greater than the frame frequency, and counting the number of periods of the reference signal in one period of the frame frequency signal.

5. A routing switch for connection to a plurality of signal sources each providing a data stream composed of a succession of frames, each frame having first and second subframes, wherein the first subframe includes framing bits and each subframe includes multiple payload data bits and a data block bit, the framing bits having a first state to indicate start of a sequence of data block bits and otherwise having a second state, the succession of first subframes constituting a first channel and the succession of second subframes constituting a second channel, and the routing switch including:

a plurality of input modules having respective input terminals for connection to signal sources, a plurality of output modules each having an output terminal for connection to a signal destination, and a routing core for supplying selectively a channel of a first data stream and a channel of a second data stream to any selected output module for combination to provide a output data stream, and wherein the selected output module includes a circuit which selectively delays the data block bits of one the selected channel of the first data stream to bring the data block bits of the that channel into phase alignment with the data block bits of the selected channel of the second data stream.

6. A method of processing first and second data streams each composed of a succession of frames, each frame having first and second subframes, the succession of first subframes constituting a first channel and the succession of second subframes constituting a second channel, wherein each subframe includes multiple payload data bits and a data block bit and the first subframe includes a framing character having a fieriest state to indicate start of a sequence of data block bits and otherwise having a second state, said method comprising:

(a) composing an output data stream from a selected channel of the first data stream and a selected channel of the second data stream, and (b) delaying the data block bits of the selected channel of the first data stream relative to the payload data bits of the selected channel of the first data stream to bring the data block bits of that channel into phase alignment with the data block bits of the selected channel of the second data stream.

7. A method according to claim 6, wherein step (a) includes:
   (i) decomposing each subframe of the first data stream to generate a pair of subframe words, wherein each subframe word includes a start bit having a first state to indicate start of a sequence of data block bits and otherwise having a second state,
   (ii) decomposing each subframe of the second data stream LO generate a pair or subframe words, wherein each subframe word includes a start bit having a first state to indicate start of a sequence of data block bits and otherwise having a second state, and
   (iii) extracting one subframe word of each pair generated in step (i) and extracting one subframe word of each pair generated in step (ii), and step (b) includes:
      (i) testing the start bits of the extracted subframe words to identify the start of each sequence of data block bits,
      (ii) measuring time delay between occurrence of the start bit of said other channel in said first state and occurrence of the start bit of said one channel in said first state, and
      (iii) delaying the data block bits of said one channel by said time delay.

\* \* \* \* \*

UNITED STATES PATENT AND TRADEMARK OFFICE
CERTIFICATE OF CORRECTION

PATENT NO. : 6,757,302 B1  
DATED : June 29, 2004  
INVENTOR(S) : Donald S. Lydon and Charles S. Meyer Page 1 of 1

It is certified that error appears in the above-identified patent and that said Letters Patent is hereby corrected as shown below:

Column 9,
Line 55, "As" should be deleted and replaced with -- as --.

Column 10,
Line 48, "a" should be deleted and replaced with -- an --.
Line 50, "one" should be deleted.
Line 62, "fieriest" should be deleted and replaced with -- first --.

Column 11,
Line 15, "LO" should be deleted and replaced with -- to --.

Signed and Sealed this

Third Day of August, 2004

JON W. DUDAS
*Acting Director of the United States Patent and Trademark Office*